United States Patent
Chen et al.

(10) Patent No.: US 10,616,795 B2
(45) Date of Patent: Apr. 7, 2020

(54) METHODS AND APPARATUS FOR WIRELESS COEXISTENCE BASED ON TRANSCEIVER CHAIN EMPHASIS

(71) Applicant: Apple Inc., Cupertino, CA (US)

(72) Inventors: Camille Chen, Cupertino, CA (US); Lei Li, Cupertino, CA (US); Chris Zimmermann, San Jose, CA (US); Michael J. Giles, San Jose, CA (US); Jaime Tolentino, Sunnyvale, CA (US); Chris Hartman, San Jose, CA (US); Arthur Lin, Cupertino, CA (US)

(73) Assignee: Applie Inc., Cupertino, CA (US)

( * ) Notice: Subject to any disclaimer, the term of this patent is extended or adjusted under 35 U.S.C. 154(b) by 0 days.

(21) Appl. No.: 15/960,421

(22) Filed: Apr. 23, 2018

(65) Prior Publication Data

US 2018/0317127 A1    Nov. 1, 2018

Related U.S. Application Data

(63) Continuation of application No. 15/099,397, filed on Apr. 14, 2016, now Pat. No. 9,955,379, which is a
(Continued)

(51) Int. Cl.
*H04W 28/04* (2009.01)
*H04B 17/318* (2015.01)
(Continued)

(52) U.S. Cl.
CPC .......... *H04W 28/04* (2013.01); *H04B 7/0413* (2013.01); *H04B 17/318* (2015.01);
(Continued)

(58) Field of Classification Search
CPC ....... H04W 4/80; H04W 16/14; H04W 24/02; H04W 24/06; H04W 24/10; H04W 28/04;
(Continued)

(56) References Cited

U.S. PATENT DOCUMENTS 6,560,443 B1    5/2003   Vaisanen et al.
6,646,505 B2   11/2003   Anderson et al.
(Continued)

FOREIGN PATENT DOCUMENTS

CN    101043237 A    9/2007
CN    101379783 A    3/2009
(Continued)

OTHER PUBLICATIONS

Bluetooth Advanced Audio Distribution Profile, v12, Apr. 16, 2007.
(Continued)

*Primary Examiner* — Tri H Phan
(74) *Attorney, Agent, or Firm* — Gadzkin & Associates, PC

(57) ABSTRACT

Methods and apparatus for reduction of interference between a plurality of wireless interfaces. In one exemplary embodiment, a device having a first (e.g., Wi-Fi) interface and a second (e.g., Bluetooth) interface monitors interference between its interfaces. A reduction in transmit power of the Wi-Fi module causes a disproportionately larger reduction in undesirable interference experienced at the Bluetooth antennas. For example, when the Bluetooth interface detects interference levels above acceptable thresholds, the Wi-Fi interface adjusts operation of one or more of its transmit chains based on various conditions such as duty cycle, Received Signal Strength Indication (RSSI), etc. Various embodiments of the present invention provide simultaneous operation of WLAN and PAN interfaces, without requiring time division coexistence, by reducing power on a subset of interfering antennas.

20 Claims, 7 Drawing Sheets

Related U.S. Application Data continuation of application No. 14/095,913, filed on Dec. 3, 2013, now Pat. No. 9,319,887, which is a continuation of application No. 13/025,059, filed on Feb. 10, 2011, now Pat. No. 8,599,709.

(51) Int. Cl.

| | | |
|---|---|---|
| *H04B 7/0413* | (2017.01) | |
| *H04W 16/14* | (2009.01) | |
| *H04W 24/02* | (2009.01) | |
| *H04W 24/10* | (2009.01) | |
| *H04W 28/18* | (2009.01) | |
| *H04W 4/80* | (2018.01) | |
| *H04W 52/24* | (2009.01) | |
| *H04W 92/18* | (2009.01) | |
| *H04L 1/24* | (2006.01) | |
| *H04L 1/20* | (2006.01) | |
| *H04W 24/06* | (2009.01) | |
| *H04W 84/12* | (2009.01) | |
| *H04W 84/18* | (2009.01) | |
| *H04W 88/06* | (2009.01) | |

(52) U.S. Cl.
CPC .............. *H04L 1/24* (2013.01); *H04W 4/80* (2018.02); *H04W 16/14* (2013.01); *H04W 24/02* (2013.01); *H04W 24/10* (2013.01); *H04W 28/18* (2013.01); *H04W 52/243* (2013.01); *H04W 92/18* (2013.01); *H04L 1/20* (2013.01); *H04W 24/06* (2013.01); *H04W 84/12* (2013.01); *H04W 84/18* (2013.01); *H04W 88/06* (2013.01); *Y02D 70/00* (2018.01); *Y02D 70/1244* (2018.01); *Y02D 70/1246* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/22* (2018.01)

(58) Field of Classification Search
CPC ... H04W 28/18; H04W 52/24; H04W 52/243; H04W 84/12; H04W 84/18; H04W 88/06; H04W 92/18; H04L 1/20; H04L 1/24; H04B 7/0413; H04B 17/318; Y02D 70/00; Y02D 70/22; Y02D 70/142; Y02D 70/144; Y02D 70/146; Y02D 70/162; Y02D 70/1244; Y02D 70/1246; Y02D 70/1262

See application file for complete search history.

(56) References Cited

U.S. PATENT DOCUMENTS

| | | | |
|---|---|---|---|
| 6,774,864 B2 | 8/2004 | Evans et al. | |
| 6,873,825 B2* | 3/2005 | Pattabiraman | H04B 1/715 |
| | | | 370/338 |
| 6,978,121 B1 | 12/2005 | Lane et al. | |
| 7,142,864 B2 | 11/2006 | Laroia et al. | |
| 7,146,133 B2 | 12/2006 | Bahl et al. | |
| 7,181,182 B2 | 2/2007 | Cha et al. | |
| 7,200,376 B2 | 4/2007 | Cha et al. | |
| 7,200,378 B2 | 4/2007 | Cornett | |
| 7,224,704 B2 | 5/2007 | Lu et al. | |
| 7,253,783 B2 | 8/2007 | Chiang et al. | |
| 7,295,860 B2 | 11/2007 | Suwa | |
| 7,301,924 B1 | 11/2007 | Gurbuz et al. | |
| 7,352,332 B1 | 4/2008 | Betts-Lacroix et al. | |
| 7,352,688 B1 | 4/2008 | Perahia et al. | |
| 7,359,730 B2 | 4/2008 | Dennis et al. | |
| 7,362,275 B2 | 4/2008 | Tu et al. | |
| 7,366,244 B2 | 4/2008 | Gebara et al. | |
| 7,444,119 B2 | 10/2008 | Bekritsky et al. | |
| 7,505,790 B2 | 3/2009 | Chang et al. | |
| 7,546,142 B2 | 6/2009 | Ginzburg et al. | |
| 7,561,904 B2 | 7/2009 | Lagnado | |
| 7,571,079 B2 | 8/2009 | Chin et al. | |
| 7,574,179 B2 | 8/2009 | Barak et al. | |
| 7,606,553 B2 | 10/2009 | Konaka | |
| 7,623,879 B2 | 11/2009 | Honkanen et al. | |
| 7,640,373 B2 | 12/2009 | Cudak et al. | |
| 7,657,411 B2 | 2/2010 | Poetsch et al. | |
| 7,701,913 B2 | 4/2010 | Chen et al. | |
| 7,760,679 B2 | 7/2010 | Baker et al. | |
| 7,813,295 B2 | 10/2010 | Trachewsky | |
| 7,813,314 B2 | 10/2010 | Fulknier et al. | |
| 7,826,459 B2 | 11/2010 | Xhafa et al. | |
| 7,949,364 B2 | 5/2011 | Kasslin et al. | |
| 7,974,299 B1 | 7/2011 | Banerjea et al. | |
| 8,019,280 B2 | 9/2011 | Tsfaty et al. | |
| 8,072,896 B2 | 12/2011 | Wilhelmsson | |
| 8,072,914 B2 | 12/2011 | Brisebois et al. | |
| 8,121,072 B2 | 2/2012 | Awad et al. | |
| 8,121,573 B2 | 2/2012 | Haralabidis et al. | |
| 8,200,161 B2 | 6/2012 | Walley et al. | |
| 8,204,036 B2 | 6/2012 | Russell et al. | |
| 8,265,017 B2 | 9/2012 | Robinson et al. | |
| 8,270,500 B2 | 9/2012 | Tidestav | |
| 8,284,721 B2 | 10/2012 | Chen et al. | |
| 8,284,725 B2 | 10/2012 | Ahmadi | |
| 8,295,395 B2 | 10/2012 | Mueck et al. | |
| 8,331,289 B1* | 12/2012 | Lee | H04B 1/006 |
| | | | 370/328 |
| 8,340,578 B2 | 12/2012 | Tolentino et al. | |
| 8,346,171 B1 | 1/2013 | Mack | |
| 8,379,548 B1 | 2/2013 | Husted | |
| 8,396,003 B2 | 3/2013 | Leinonen et al. | |
| 8,417,187 B2 | 4/2013 | Chen et al. | |
| 8,477,703 B2 | 7/2013 | Sun et al. | |
| 8,594,049 B2 | 11/2013 | Ohta | |
| 8,599,705 B2 | 12/2013 | Agrawal et al. | |
| 8,599,709 B2 | 12/2013 | Chen et al. | |
| 8,665,781 B2 | 3/2014 | Awad et al. | |
| 8,670,421 B2 | 3/2014 | Fuccello et al. | |
| 8,731,568 B1 | 5/2014 | Epstein et al. | |
| 8,787,288 B2 | 7/2014 | Shi et al. | |
| 8,792,832 B2 | 7/2014 | Chen et al. | |
| 8,804,624 B1 | 8/2014 | Lee et al. | |
| 8,831,655 B2 | 9/2014 | Burchill et al. | |
| 8,831,675 B2 | 9/2014 | Wang et al. | |
| 8,909,165 B2 | 12/2014 | Hendin | |
| 8,989,762 B1 | 3/2015 | Negus et al. | |
| 8,995,553 B2 | 3/2015 | Chen et al. | |
| 8,995,996 B2 | 3/2015 | Bims | |
| 9,055,497 B2* | 6/2015 | Koo | H04W 36/20 |
| 9,113,349 B2* | 8/2015 | Tolentino | H04B 15/00 |
| 9,178,722 B1 | 11/2015 | Gong | |
| 9,319,887 B2* | 4/2016 | Chen | H04W 28/18 |
| 9,445,275 B2 | 9/2016 | Chen et al. | |
| 9,839,041 B2* | 12/2017 | Tolentino | H04B 15/00 |
| 2001/0010689 A1 | 8/2001 | Awater et al. | |
| 2001/0055952 A1 | 12/2001 | Ficarra | |
| 2002/0136184 A1 | 9/2002 | Liang et al. | |
| 2002/0136233 A1 | 9/2002 | Chen et al. | |
| 2002/0173272 A1 | 11/2002 | Liang et al. | |
| 2003/0125019 A1 | 7/2003 | Bajikar | |
| 2004/0165548 A1 | 8/2004 | Backes | |
| 2004/0166886 A1 | 8/2004 | Laroia et al. | |
| 2004/0192222 A1 | 9/2004 | Vaisanen et al. | |
| 2004/0242159 A1 | 12/2004 | Calderon et al. | |
| 2004/0259589 A1 | 12/2004 | Bahl et al. | |
| 2005/0026624 A1 | 2/2005 | Gandhi et al. | |
| 2005/0053034 A1 | 3/2005 | Chiueh | |
| 2005/0059347 A1 | 3/2005 | Haartsen | |
| 2005/0141895 A1 | 6/2005 | Ruiz | |
| 2005/0170776 A1 | 8/2005 | Siorpaes | |
| 2005/0192048 A1 | 9/2005 | Bridgelall | |
| 2005/0208900 A1 | 9/2005 | Karacaoglu | |
| 2005/0215197 A1 | 9/2005 | Chen et al. | |
| 2005/0215284 A1 | 9/2005 | Su et al. | |
| 2005/0239497 A1 | 10/2005 | Bahl et al. | |

(56) References Cited

U.S. PATENT DOCUMENTS

| | | |
|---|---|---|
| 2005/0276241 A1 | 12/2005 | Kamerman et al. |
| 2006/0005058 A1 | 1/2006 | Chen et al. |
| 2006/0030265 A1 | 2/2006 | Desai et al. |
| 2006/0030266 A1 | 2/2006 | Desai et al. |
| 2006/0030278 A1 | 2/2006 | Konaka |
| 2006/0034217 A1 | 2/2006 | Kwon et al. |
| 2006/0035653 A1 | 2/2006 | Karaoguz et al. |
| 2006/0084383 A1 | 4/2006 | Ibrahim et al. |
| 2006/0094364 A1 | 5/2006 | Hirota et al. |
| 2006/0114864 A1 | 6/2006 | Fuccello et al. |
| 2006/0133259 A1 | 6/2006 | Lin et al. |
| 2006/0133334 A1 | 6/2006 | Ross |
| 2006/0209763 A1 | 9/2006 | Emeott et al. |
| 2006/0223450 A1 | 10/2006 | Dacosta et al. |
| 2006/0262739 A1 | 11/2006 | Ramirez et al. |
| 2006/0274704 A1 | 12/2006 | Desai et al. |
| 2006/0292986 A1 | 12/2006 | Bitran et al. |
| 2006/0292987 A1 | 12/2006 | Ophir et al. |
| 2007/0026718 A1 | 2/2007 | Sturm et al. |
| 2007/0060055 A1 | 3/2007 | Desai et al. |
| 2007/0066227 A1 | 3/2007 | Duerdodt et al. |
| 2007/0076649 A1 | 4/2007 | Lin et al. |
| 2007/0080781 A1 | 4/2007 | Ginzburg et al. |
| 2007/0099567 A1 | 5/2007 | Chen et al. |
| 2007/0109973 A1 | 5/2007 | Trachewsky |
| 2007/0161352 A1 | 7/2007 | Dobrowski et al. |
| 2007/0223430 A1 | 9/2007 | Desai et al. |
| 2007/0224936 A1 | 9/2007 | Desai |
| 2007/0232358 A1 | 10/2007 | Sherman |
| 2007/0238483 A1 | 10/2007 | Boireau et al. |
| 2007/0286122 A1 | 12/2007 | Fonseca |
| 2008/0013500 A1 | 1/2008 | Laroia et al. |
| 2008/0026718 A1 | 1/2008 | Wangard et al. |
| 2008/0069063 A1 | 3/2008 | Li et al. |
| 2008/0080455 A1 | 4/2008 | Rofougaran |
| 2008/0089690 A1 | 4/2008 | Ruiz |
| 2008/0095263 A1 | 4/2008 | Xu et al. |
| 2008/0108394 A1 | 5/2008 | Davis et al. |
| 2008/0125047 A1 | 5/2008 | Li et al. |
| 2008/0130603 A1 | 6/2008 | Wentink et al. |
| 2008/0192806 A1 | 8/2008 | Wyper et al. |
| 2008/0200124 A1 | 8/2008 | Capretta et al. |
| 2008/0207126 A1 | 8/2008 | Grushkevich et al. |
| 2008/0224869 A1 | 9/2008 | Kaplan |
| 2008/0233967 A1 | 9/2008 | Montojo et al. |
| 2008/0259846 A1 | 10/2008 | Gonikberg et al. |
| 2008/0279138 A1 | 11/2008 | Gonikberg et al. |
| 2008/0279162 A1 | 11/2008 | Desai |
| 2008/0279163 A1 | 11/2008 | Desai |
| 2008/0309490 A1 | 12/2008 | Honkanen et al. |
| 2008/0313315 A1 | 12/2008 | Karaoguz et al. |
| 2009/0040937 A1 | 2/2009 | Xhafa et al. |
| 2009/0081962 A1 | 3/2009 | Sohrabi |
| 2009/0111379 A1 | 4/2009 | Abe et al. |
| 2009/0137206 A1 | 5/2009 | Sherman et al. |
| 2009/0147763 A1 | 6/2009 | Desai et al. |
| 2009/0176454 A1 | 7/2009 | Chen et al. |
| 2009/0257379 A1 | 10/2009 | Robinson et al. |
| 2009/0262669 A1 | 10/2009 | Sanders |
| 2009/0285167 A1 | 11/2009 | Hirsch et al. |
| 2009/0323652 A1 | 12/2009 | Chen et al. |
| 2010/0034381 A1 | 2/2010 | Trace et al. |
| 2010/0054512 A1 | 3/2010 | Solum |
| 2010/0113090 A1 | 5/2010 | Lin et al. |
| 2010/0153395 A1 | 6/2010 | Hannuksela et al. |
| 2010/0254335 A1 | 10/2010 | Koo et al. |
| 2010/0273426 A1 | 10/2010 | Walley et al. |
| 2010/0304770 A1 | 12/2010 | Wietfeldt et al. |
| 2010/0316027 A1 | 12/2010 | Rick et al. |
| 2010/0322222 A1 | 12/2010 | Desai |
| 2011/0019561 A1 | 1/2011 | Yun et al. |
| 2011/0081858 A1 | 4/2011 | Tolentino et al. |
| 2011/0090982 A1 | 4/2011 | Chen et al. |
| 2011/0170424 A1 | 7/2011 | Safavi |
| 2012/0032854 A1 | 2/2012 | Bull et al. |
| 2012/0140690 A1 | 6/2012 | Choi et al. |
| 2012/0264388 A1 | 10/2012 | Guo et al. |
| 2013/0012134 A1 | 1/2013 | Jin et al. |
| 2013/0143949 A1 | 6/2013 | Shen et al. |
| 2013/0225100 A1 | 8/2013 | Chen et al. |
| 2013/0260821 A1 | 10/2013 | Deparis et al. |
| 2013/0303214 A1 | 11/2013 | Ahmadi et al. |
| 2013/0329821 A1 | 12/2013 | Chen et al. |
| 2013/0331137 A1 | 12/2013 | Burchill et al. |
| 2014/0218255 A1 | 8/2014 | Sanford et al. |
| 2015/0133185 A1 | 5/2015 | Chen et al. |
| 2015/0257011 A1 | 9/2015 | Chen et al. |

FOREIGN PATENT DOCUMENTS

| | | |
|---|---|---|
| CN | 102170644 A | 8/2011 |
| CN | 102170664 A | 8/2011 |
| EP | 1389855 A2 | 2/2004 |
| EP | 1489788 A2 | 12/2004 |
| EP | 1583295 A2 | 10/2005 |
| EP | 1605643 A1 | 12/2005 |
| EP | 1626541 A2 | 2/2006 |
| EP | 1653672 A1 | 5/2006 |
| EP | 1838040 A2 | 9/2007 |
| EP | 1906555 A1 | 4/2008 |
| EP | 2244509 A2 | 10/2010 |
| JP | 2004032462 A | 1/2004 |
| WO | WO-2006090242 A1 | 8/2006 |
| WO | WO-2008001272 A2 | 1/2008 |
| WO | WO-2008034038 A1 | 3/2008 |
| WO | WO-2008041071 A2 | 4/2008 |
| WO | WO-2009055714 A2 | 4/2009 |
| WO | WO-2009090503 A1 | 7/2009 |
| WO | WO-2011028481 A2 | 3/2011 |
| WO | WO-2011123550 A1 | 10/2011 |

OTHER PUBLICATIONS

Bluetooth Audio/Video Remote Control Profile, v13, Apr. 16, 2007.
Bluetooth Basic Imaging Profile (BIP), Jul. 25, 2003.
Bluetooth Basic Printing Profile (BPP), v12r00, Apr. 27, 2006.
Bluetooth Cordless Telephony Profile (CTP), excerpt from Bluetooth Specification v1.1, Feb. 22, 2001.
Bluetooth Device Identification Profile v13, Jul. 26, 2007.
Buettner, et al., X-MAC: A Short Preamble Mac Protocol for Duty-Cycled Wireless Sensor Networks, 2006.
Chiasserini, et al., "Coexistence Mechanisms for Interference Mitigation Between IEEE 802.11 WLANS and Bluetooth," IEEE Infocom, 2002, pp. 590-598, 0-7-803-7476-2/02/.COPYRGT.2002 IEEE.
Ophir, et al., WI-FI (IEEE802.11) and Bluetooth Coexistence: Issues and Solutions, pp. 847-852, 0-7803-8523-3/04/ COPYRGT. 2004 IEEE.
Specification of the Bluetooth System, vol. 0, v2.1 + EDR, Jul. 26, 2007.

* cited by examiner

METHODS AND APPARATUS FOR WIRELESS COEXISTENCE BASED ON TRANSCEIVER CHAIN EMPHASIS

PRIORITY AND RELATED APPLICATIONS

This application is a continuation of, and claims the benefit of priority to, co-owned and co-pending U.S. patent application Ser. No. 15/099,397 of the same title filed Apr. 14, 2016, issuing as U.S. Pat. No. 9,955,379 on Apr. 24, 2018, which is a continuation of, and claims the benefit of priority to, co-owned U.S. patent application Ser. No. 14/095,913 of the same title filed Dec. 3, 2013, issued as U.S. Pat. No. 9,319,887 on Apr. 19, 2016, which is a continuation of, and claims the benefit of priority to, co-owned U.S. patent application Ser. No. 13/025,059 of the same title filed Feb. 10, 2011, issued as U.S. Pat. No. 8,599,709 on Dec. 3, 2013, each of the foregoing incorporated herein by reference in its entirety.

This application is also related to co-owned U.S. patent application Ser. No. 12/006,992 filed Jan. 7, 2008 and entitled "Methods and Apparatus for Wireless Device Coexistence", issued as U.S. Pat. No. 8,417,187; Ser. No. 12/082,586 filed Apr. 11, 2008 entitled "Methods and Apparatus for Network Capacity Enhancement for Wireless Device Coexistence", issued as U.S. Pat. No. 8,265,017; Ser. No. 12/215,574 filed Jun. 26, 2008 entitled "Methods and Apparatus for Antenna Isolation-Dependent Coexistence in Wireless Systems", issued as U.S. Pat. No. 8,284,721; Ser. No. 12/573,755 filed Oct. 5, 2009 entitled "Methods and Apparatus for Enhanced Coexistence Algorithms in Wireless Systems", issued as U.S. Pat. No. 8,340,578; and Ser. No. 12/821,823 filed Jun. 23, 2010 entitled "Methods and Apparatus for Dynamic Wireless Device Coexistence", issued as U.S. Pat. No. 8,693,569, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to compensating for and/or mitigating the effects of electro-magnetic signal interference in devices implementing multiple wireless air interfaces or protocols.

2. Description of Related Technology

The effective implementation of convergence products has led to a revolution in the way consumers view computerized devices. These next generation computerized devices focus on offering consumers a substantially unified solution for a variety of services to which consumers have become accustomed. Examples of such a converged solution include the exemplary MacBook Air™ laptop computer, MacBook Pro™, and iMac™ desktop, and iPhone™ smartphone, each manufactured by the Assignee hereof, and each of which support a variety of wireless protocols and other functions. For instance, the aforementioned iPhone smartphone has the capability of, among other things, sending and receiving data over a Wireless Local Area Network (WLAN) such as a Wi-Fi network, making and receiving calls using a cellular network such as a Global System for Mobile Communications (GSM) network, and operating wireless peripheral equipment (such as wireless headsets or Human Interface Devices (HIDs)) using a Personal Area Network (PAN) such as a Bluetooth network. Similarly, the aforementioned Macbook Air provides high speed WLAN capabilities in conjunction with wireless PAN accessory functionality (mouse, keyboard, etc.)

As product form factors shrink, implementation requirements and constraints (including cost, size, and antenna isolation) in these hardware systems inevitably introduce difficulties which can potentially result in a poor user experience with the device. For example, both Bluetooth and Wi-Fi (802.11b/g/n) can operate within the 2.4-2.4835 GHz frequency range, and when used simultaneously in close proximity, will often interfere with each other. This interference can cause operational problems which may be perceptible to the user, such as Bluetooth audio stutter and drop-outs, slow Wi-Fi transfer speeds, poor Bluetooth mouse (MS) or trackpad tracking, MS or trackpad or keyboard link dropouts, etc., thereby degrading user experience (and potentially affecting other aspects of operation).

New technologies will continue to exacerbate such coexistence problems by further crowding the available radio spectrum. For instance, incipient changes to Wi-Fi standards offer higher order Multiple Input Multiple Output (MIMO) type antenna operation. Future implementations of Wi-Fi will support both 2×2 operation (two (2) receive antennas, two (2) transmit antennas) and 3×3 operation (three (3) receive antennas, three (3) transmit antennas). Changes to the Bluetooth protocol will increase transmit power (e.g., 10-20 dBm). Yet other emerging technologies, such as Zigbee™ Wireless Universal Serial Bus (USB), WiMAX, etc. will further crowd the same radio spectrum.

Existing solutions have relied on "time division coexistence" to manage RF interference between different protocols. Time division coexistence allocates each radio exclusive access to the radio resource over a specific time interval. However, time division coexistence has certain limitations. Consider for example, a 3×3 Wi-Fi modem that can achieve over 200 Mbps, in conjunction with a Bluetooth modem that operates at 3 Mbps. Most Bluetooth applications are used in wireless user interface accessories (e.g., mono and stereo audio applications, etc.), and are prioritized over the data-intensive Wi-Fi packets. Since Wi-Fi cannot operate during the higher priority Bluetooth time intervals, the 3×3 Wi-Fi modem can only support data rates far below its actual capabilities.

Therefore, improved methods and apparatus for device coexistence are needed. In particular, improved solutions should maximize performance for simultaneous operation of multiple radio technologies operated in close proximity, without suffering from the disabilities associated with time division coexistence.

SUMMARY OF THE INVENTION

The present invention satisfies the foregoing needs by providing, inter alia, methods and apparatus for compensating and/or mitigating the effects of electro-magnetic signal interference in devices implementing multiple wireless air interfaces or protocols.

In a first aspect of the invention, a method for calibrating a device having at least first and second wireless interfaces is disclosed. In one embodiment, the method includes: transmitting one or more test patterns on the first wireless interface; measuring interference corresponding to the one or more test patterns on the second wireless interface; calibrating one or more parameters of the first wireless interface to minimize interference with the second wireless interface; and storing the one or more calibrated parameters. The device is configured to, during at least one subsequent use, configure the first wireless interface based on the stored one or more calibrated parameters.

In a second aspect of the invention, a wireless apparatus is disclosed. In one embodiment, the apparatus includes: a first wireless interface; a second wireless interface; a processor; and a storage device in data communication with the processor, the storage device comprising computer-executable instructions. The computer-executable instructions are configured to, when executed by the processor: transmit one or more test patterns on the first wireless interface; measure interference corresponding to the one or more test patterns on the second wireless interface; calibrate one or more parameters of the first wireless interface to minimize interference with the second wireless interface; store the one or more calibrated parameters; and during at least one subsequent use, configure the first wireless interface based on the stored one or more calibrated parameters.

In another embodiment, the wireless apparatus includes: a first wireless interface; a second wireless interface; a processor; and a storage device in data communication with the processor, the storage device comprising computer-executable instructions. The computer-executable instructions are configured to, when executed by the processor: monitor a condition indicative of an interference at the second wireless interface, the interference caused at least in part by the first wireless interface; determine one or more parameters for the plurality of antennas, the parameters configured to reduce the interference; and configure the first interface according to the determined one or more parameters.

In yet another embodiment, the wireless apparatus includes a first interface configured to transmit and receive first data according to a first wireless protocol; a second interface configured to transmit and receive second data via a plurality of channels according to a second wireless protocol, the second wireless protocol differing from the first wireless protocol; and processing logic configured to: implement an interference avoidance scheme on the second interface based on determination of (i) an operational configuration of the wireless device and (ii) an operational mode of the first interface; wherein the implementation of the interference avoidance scheme is configured to reduce coexistence interference between the first and the second wireless protocols.

In a third aspect of the invention, a method for reducing interference between first and second wireless interfaces is disclosed. In one embodiment, the first interface includes a plurality of antennas, and the method includes: monitoring a condition indicative of an interference at the second wireless interface, the interference caused at least in part by the first wireless interface; determining one or more parameters for the plurality of antennas, the parameters configured to reduce the interference; and configuring the first interface according to the determined one or more parameters.

In another embodiment, the method includes determining a physical operational configuration of a wireless device, the wireless device being enabled to transact data via the first wireless interface and the second wireless interface; determining an operational mode of the first wireless interface; reducing interference between the first and second wireless interfaces, the reducing of the interference comprising deploying an interference avoidance scheme based on (i) the physical operational configuration of the wireless device being determined to be in a first one of a plurality of physical operational configurations, and (ii) the operational mode of the first wireless interface.

In a fourth aspect of the invention, a computer-readable apparatus is disclosed. In one embodiment, the apparatus includes a storage medium having at least one program disposed thereon, the program being configured to mitigate interference between two or more wireless interfaces without time division. In a fifth aspect of the invention, methods of doing business are disclosed. In one embodiment, the methods include providing a complementary or for-pay service to customers or device owners relating to optimizing their mobile device for operation with multiple air interfaces.

In a sixth aspect of the invention, a wireless optimization test system is disclosed.

In a seventh aspect of the invention, a wireless optimization text methodology and protocol is disclosed.

In an eighth aspect, a processing subsystem is disclosed. In one embodiment, the processing subsystem if configured for use in a wireless device with a plurality of wireless interfaces that includes a first interface and a second interface, the processing subsystem includes processing logic configured to: determine a physical operational configuration of the wireless device; determine an operational mode of the first interface of the plurality of wireless interfaces; implement an interference avoidance scheme based on (i) the determined physical operational configuration of the wireless device and (ii) the determined operational mode of the first interface. The implementation of the interference avoidance scheme is configured to reduce coexistence interference between the first interface and the second interface.

Other features and advantages of the present invention will immediately be recognized by persons of ordinary skill in the art with reference to the attached drawings and detailed description of exemplary embodiments as given below.

DETAILED DESCRIPTION OF THE INVENTION

Overview

Figure 1:
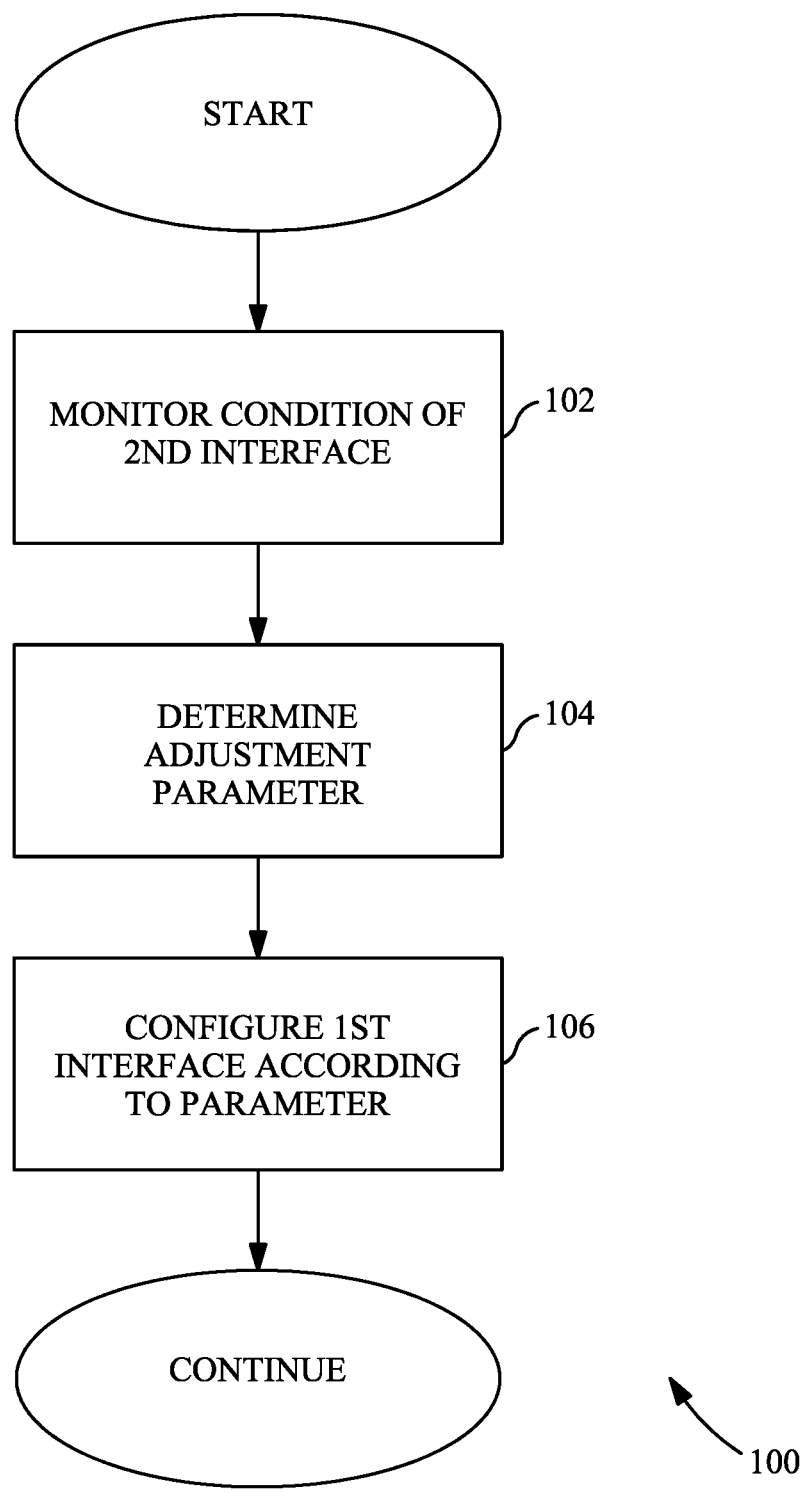
FIG. 1 graphically illustrates one embodiment of the generalized method for reducing interference among a plurality of wireless interfaces according to the invention.

The present invention provides, inter alia, methods and apparatus for mitigating the effects of radio frequency (RF) interference between co-located or proximate wireless devices (e.g., air interfaces) in a client or user device such as a mobile computer or smartphone. In one exemplary embodiment, the methods and apparatus dynamically mitigate the interference between co-located Wireless Local Area Network (WLAN) (e.g., Wi-Fi) and Personal Area Network (PAN) (e.g., Bluetooth) air interfaces disposed within a physically constrained (e.g., small form factor) device by adjusting one or more parameters specific to each transmit "chain". For example, each transmit chain of the WLAN can be calibrated to a specific transmit power, where the calibrated transmit power is configured to minimize interference with the nearby but unrelated PAN. In one embodiment of the invention, a device having a first (e.g., Wi-Fi) interface and a second (e.g., Bluetooth) interface that monitors interference between its interfaces is disclosed. When the second interface detects interference levels above acceptable thresholds, the first interface adjusts operation of each of its transmit chains. In one variant, the first interface retrieves a vector that has predetermined gain coefficients for each of the plurality of its antennas. Alternatively, the first interface may determine (e.g., during operation (also referred to as "runtime"), during test modes, etc.) one or more gain coefficients for each of its plurality of antennas.

Methods and apparatus for testing and calibrating a fabricated device are also disclosed. Due to the complexity of RF design (e.g., component tolerances, non-linear effects, etc.), each fabricated device has a unique RF environment (even devices manufactured to the same design specification). Consequently, in one embodiment of the invention, new designs and form factors are validated and/or calibrated with empirically gathered data after fabrication. The determined post-fabrication parameters are stored in the device for subsequent use. For example, a device is calibrated such that its specific antenna gain parameters for a WLAN are configured to minimally affect its PAN antenna(s) during simultaneous operation. As described subsequently herein, a reduction in transmit power of the WLAN antennas causes a disproportionately larger reduction in undesirable interference experienced at the PAN antennas and vice versa (PAN transmissions can interfere with WLAN antennas). Consequently, various embodiments of the present invention advantageously provide simultaneous operation of WLAN and PAN interfaces without requiring time division coexistence.

Interference mitigation schemes are disclosed which employ e.g., multiple stages of interference reduction, including: (i) no adjustment, (ii) transmit chain adjustment, and (iii) existing legacy interference suppression.

Detailed Description of Exemplary Embodiments

Exemplary embodiments of the present invention are now described in detail. While these embodiments are primarily discussed in the context of PAN (e.g., Bluetooth) and WLAN (e.g., Wi-Fi) air interface coexistence, it will be recognized by those of ordinary skill that the present invention is not limited to any particular wireless protocols or ranges. In fact, the principles discussed herein are equally applicable to any number of wireless protocols which either (i) at least partly share frequency bands, and/or (ii) experience antenna isolation problems as a result of close proximity or co-location (e.g., high-powered out-of-band emissions may leak into the active radio band).

As used herein, the term "co-located", "co-location", etc. refers without limitation to two or more devices or components which are sufficiently physically proximate one another so as to cause at least some level of interference with the operation of at least one of the devices/components. Such proximity may occur in cases where the devices are within the same host device or form factor, or alternatively when they are physically separate from one another (i.e., not in the same host), but placed proximate one another.

As used herein, the term "transmit chain" refers generally and without limitation to the signal processing and modulation path used to transmit data wirelessly; similarly the term "receive chain" refers to the demodulation and signal processing path used to receive wireless data. For example, a 3×3 Multiple Input Multiple Output (MIMO) interface has three (3) transmit chains and three (3) receive chains.

Furthermore, as used herein, the term "wireless" refers without limitation to any wireless signal, data, communication, or other interface, protocol or access scheme including without limitation Wi-Fi, Bluetooth, 3G, LTE/LTE-A, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Moreover, while discussed primarily in the context of a basic two-protocol topology, it is recognized that other topologies (e.g., three-protocol, four-protocol, etc.) may be used consistent with the invention. For instance, cellular, Wi-Fi, Bluetooth, Zigbee, and wireless USB could conceivably be used simultaneously and could benefit from the coexistence solutions discussed subsequently herein. Similarly, PAN, WLAN and WMAN (e.g., short, medium, and long-range) interfaces may suffer coexistence problems which may be addressed by various aspects of the invention.

Additionally, it will be appreciated that the methods and apparatus of the invention may be applied to situations where more than two interfaces are co-located or proximate, but not necessarily operated all at the same time. For instance, in one variant of the invention, a user device is configured with three (3) distinct air interfaces (e.g., cellular, WLAN, PAN), yet the most common operating mode for the user device is where only a subset of the three (3) interfaces are operated simultaneously. Depending on which of the three (3) interfaces are being operated at a given time, the policies or rules applied may be different. For example, a cellular interface might have significant mutual interference issues with a WLAN interface, but not with a PAN interface. Similarly, the PAN interface might have significant issues with the WLAN interface, but not the cellular interface. The present invention explicitly contemplates the dynamic selection and application of one or more operating policies or configurations based on a determination of which interfaces are operating at a given time.

Intermodulation Distortion—

It has been empirically shown that for devices having a WLAN interface and a PAN interface, the $3^{rd}$- and $5^{th}$-order intermodulation products of the WLAN transmitter contribute to the majority of out of band (OOB) spectral regrowth which directly interferes with the PAN interface. "Intermodulation products" or "intermodulation distortions" are the unwanted results caused by imperfect modulation of signals containing different frequencies.

As a brief aside, it is well known in the related signal processing arts that a sinusoid signal input to a linear time-invariant system will produce an output sinusoid signal of the same frequency, possibly having a different amplitude or phase. Similarly, inputting a plurality of sinusoid signals to a linear time-invariant system will produce output sinusoids having frequency products at the sum and difference frequencies of the input frequencies.

In actuality, however, multiple distortions and unpredictable products are created when processing sinusoidal signals (due to e.g., unpredictable nonlinearities, component tolerances, etc.). Many non-linear systems will generate so-called "harmonics." A harmonic is an integer multiple of an input frequency. An $N^{th}$ order harmonic occurs at N integer multiples; for instance frequency F has a second order harmonic at 2F, and a third order harmonic at 3F, etc. Intermodulation occurs when the input to a non-linear system is composed of two or more different frequencies, especially when these frequencies are close to each other, that interact to create unwanted frequency components. For example, consider an input signal that contains two frequency components $f_A$ and $f_B$. Intermodulation distortions will be found at $K_A f_A + K_B f_B$ frequencies, where $K_A$ and $K_B$ are integers. The order of any given intermodulation product is the sum of the absolute values of the coefficients $K_N$; for example, the in-band intermodulation product at the frequency $-f_A+2f_B$ is a third order intermodulation product (i.e., $K_A=-1$, and $K_B=2$).

Intermodulation products have undesirable side-effects, similar to environmental noise and other interference. However, it is of particular relevance to high density form factor devices; specifically, where intermodulation products from one wireless interface will cross over to neighboring wireless interfaces.

Fortunately, it has been empirically observed that reductions in transmit power of a first antenna will cause disproportionately larger reductions in undesirable interference experienced at neighboring antennas. For instance, every 1 dB reduction in the in-band power (approximately 20%), will reduce the $3^{rd}$ order intermodulation magnitudes by about 3 dB (approximately 50%). Similarly, the $5^{th}$ order intermodulation magnitude Will be reduced by about 5 dB (approximately 70%). Accordingly, as described in greater detail hereinafter, the disproportionate relationship between transmit power and intermodulation products can be leveraged to improve PAN performance, without excessively detracting from WLAN operation.

Methods—

Various embodiments of methods for reduction of interference between a plurality of wireless interfaces during operation according to the invention are now described, as are methods for testing and calibrating a device.

Interference Reduction—

Referring now to FIG. 1, one embodiment of the generalized method for reducing interference among a plurality of wireless interfaces is illustrated. The first and second interfaces of this embodiment are a Wireless Local Area Network (WLAN), and Personal Area Network (PAN), respectively. At least one of the first and second interfaces has one or more transmit or receive antennas. Common examples of such operation include, but are not limited to Multiple Input Multiple Output (MIMO) operation, Multiple Input Single Output (MISO) operation, and Single Input Multiple Output operation (SIMO).

At step 102, one or more conditions of a second interface are monitored. The monitored conditions are indicative of an interference at an interface, caused by another ones of the interface. For example, a wireless device having a Wi-Fi interface operating in close proximity to a Bluetooth interface can monitor the received data at the Bluetooth interface to determine if the Wi-Fi interface is degrading Bluetooth performance below acceptable thresholds. In some variants, the Bluetooth performance is only monitored at salient points such as: start up, when a neighboring interface (e.g., Wi-Fi) interface is powered up, during data transfers, etc. Other schemes (such as continuous monitoring, monitoring periodically, upon initiation of certain applications or components etc., as described below) may be used as well if desired and depending on the intended application. The monitored conditions are indicative of an interference (regardless of causation) at one of the plurality of interfaces. For example, Bluetooth operation is dynamically monitored at runtime for performance degradation. In the event of poor or dropping Bluetooth performance, corrective action is triggered.

As another alternative, the monitored conditions are indicative of a likely future interference at one of the wireless interfaces, caused by other wireless interfaces. Such monitored conditions may be based on e.g., current use, historic use, detected environmental conditions, geographic location, time of day, etc.

In another embodiment, the monitored conditions are automatically executed based on one or more software applications. For example, opening a data transfer-intensive application may automatically trigger preemptive action. As another example, operating a user interface or input device that requires high responsivity may trigger preemptive action.

Common examples of monitored conditions include, but are not limited to, (i) radio channel or data/error conditions (such as: Signal to Noise Ratio (SNR), Received Signal Strength Indication (RSSI), Bit Error Rate (BER), Block Error Rate (BLER), etc.), (ii) device physical configurations (e.g., "clamshell" or "slider" type physical orientations, connection of certain interfaces or cables, etc.), and (iii) device use (e.g., execution of software, hardware operation, etc.).

At step 104 of the method, one or more parameters specific to each signal processing path (also referred to as "chains") of the plurality of interfaces are determined. In one such variant, the determined parameters are transmission gain values, specific to each transmit chain of the interfaces. For example, the determined parameters may be a so-called "power matrix", wherein each element of the power matrix corresponds to an appropriate transmission gain for a multi-antenna array.

In one embodiment, the determined parameters have been obtained previously, and are retrieved from storage e.g., memory. In one variant, the parameters have been established at device manufacture, and are stored in memory such as e.g., "factory default settings". In another variant, the parameters have been evaluated or loaded previously by the user, and retrieved from memory. The device may also be configured to select between a number of sets of parameters, based on any number of considerations including e.g., current use, historic use, desired characteristics, user preferences, etc. For instance, in one exemplary implementation, a Wi-Fi transceiver selects a transmission profile according to a desired Bluetooth bandwidth. One example calculation for required Bluetooth bandwidth has been included in Appendix A hereto.

In alternate implementations, the parameters are determined at runtime. For example, a device may identify one or more transmit chains which require adjustment, and execute a testing or "grooming" procedure such as those described in greater detail hereinafter (see Interference Calibration). Runtime embodiments can execute parameter determination during e.g., hardware or software initialization, periodically, semi-periodically, on an "as requested" basis, etc.

At step 106, at least a first of the plurality of interfaces is configured according to the determined parameter(s). For example, in one exemplary embodiment, a multi-antenna array of a first interface is configured according to the retrieved power matrix, to reduce interference at a second interface. In one variant, a multi-antenna array WLAN is configured to scale its transmission power on each of its antennas according to the retrieved power matrix.

It is noted that prior art coexistence solutions for multiple wireless interfaces have often relied on "static" behaviors; i.e., the wireless interfaces are either enabled or disabled. Specifically, these solutions can only operate with: (i) one or more protocols enabled at the same time, (ii) enable one protocol at a time in a time divisioned manner, or (iii) enable one protocol and disable the other protocols.

In contrast, the procedure of FIG. 1 herein advantageously enables more control over interfering interfaces during simultaneous operation by adjusting each chain of the corresponding interfaces. For example, consider a 3×3 WLAN interface in close proximity to a PAN interface, where the interference experienced by the PAN interface can be predominantly attributed to a subset of the transmit chains of the WLAN interface. In such a case, only a subset of the WLAN transmit antennas accounts for the majority of out of band (OOB) spectral regrowth interference on the PAN interface. In accordance with certain embodiments of the present invention, reducing the power of the offending WLAN transmit chain(s) greatly reduces the interference experienced by the PAN. WLAN operation can be affected (e.g., higher bit error rate (BER), reduced range, etc.); however, WLAN operation advantageously does not have to be disabled, thereby enhancing user experience, avoiding re-initialization procedures for the WLAN interface, etc.

Those of ordinary skill in the art will recognize that the foregoing process delivers, inter alia, "finer" granularity of control over the operation of multiple wireless protocols. In particular, reducing antenna gain (on transmit clients) can be compensated for with lower coding rates, and/or more complex coding schemes, etc. Consequently, WLAN and PAN performance can be optimized even in designs which have poor antenna isolation, by decreasing WLAN performance, to improve PAN performance.

Moreover, while prior art solutions based on time sharing require cooperation between the wireless protocols to synchronize time, certain embodiments of the present invention can advantageously be operated without any coordination between protocols. For example, a WLAN interface can detect crowded spectrum for a subset of its antennas, and adjust accordingly (i.e., move data to less crowded antennas).

It will be recognized that the foregoing generalized method of FIG. 1 is merely illustrative, and can also be incorporated within or be used complementary/supplementary with, existing coexistence schemes. Various exemplary combinations are described in greater detail hereinafter (see, for example, Example Operation discussed infra).

Interference Calibration—

Figure 2:
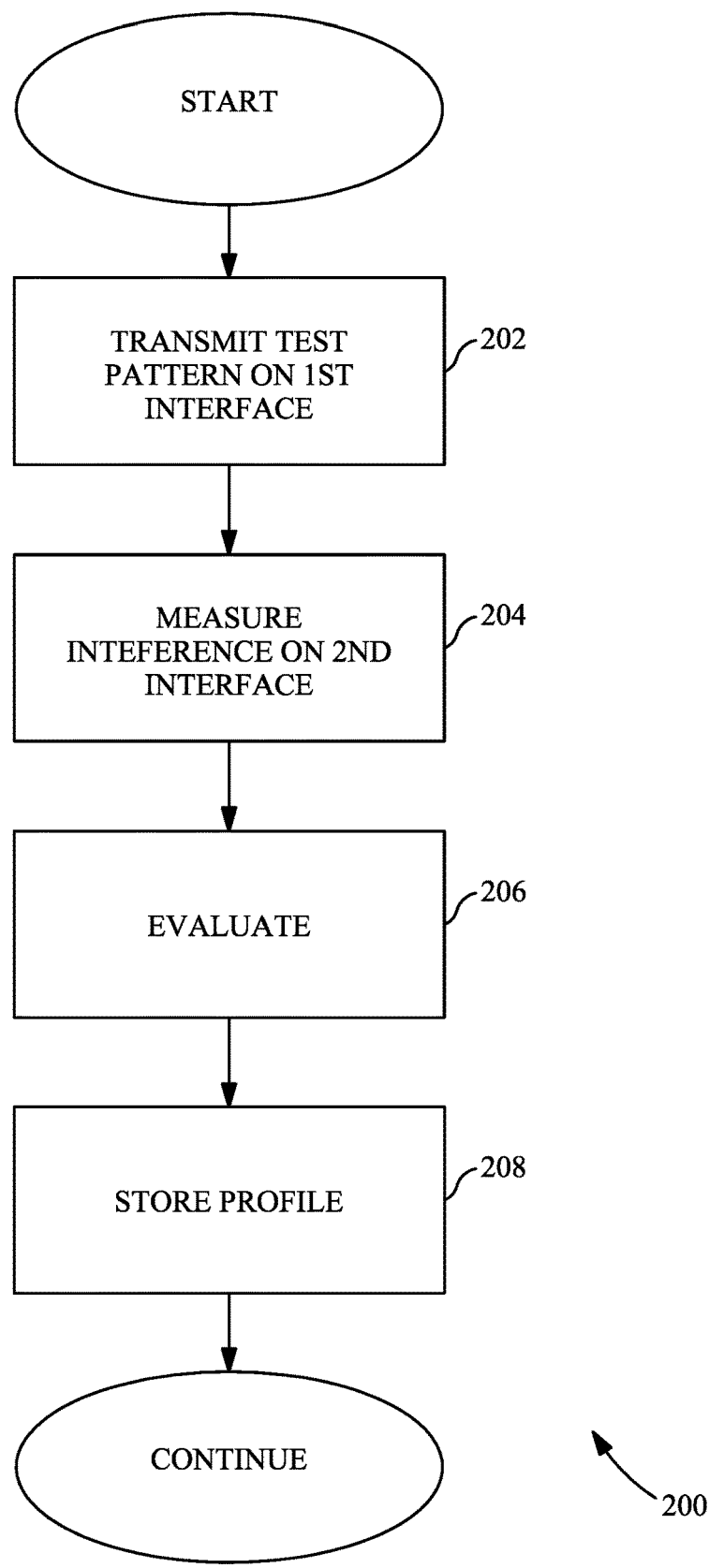
FIG. 2 graphically illustrates one embodiment of the generalized method for calculating interference among a plurality of wireless interfaces and calibrating the interfaces, according to the invention.

FIG. 2 illustrates one embodiment of a generalized method for calculating interference among a plurality of wireless interfaces, and calibrating the interfaces. In one exemplary scenario, the first and second interfaces each have one or more transmit or receive antennas; the method is advantageously applicable to interfaces with varying numbers of antennas. In some embodiments, interference calibration for is performed at or shortly after device manufacture. In alternate embodiments, interference calibration is performed by the customer on an as needed basis (e.g., during initial network setup, etc.) In yet further embodiments, interference calibration can be executed automatically by the device e.g., based on performance, time, geographic context, etc.

At step 202 of the method, a test pattern may be transmitted on at least a first of the plurality of wireless interfaces. While test patterns are generally desirable for consistent and accurate results, it is appreciated that runtime calibration may not be able to interrupt normal operation to execute a test. Accordingly, other embodiments may utilize "live" data rather than an artificial test pattern.

In one exemplary embodiment, the test pattern is transmitted according to one or more transmit chain-specific parameters, such as e.g., a power matrix, wherein each element of the power matrix corresponds to a transmission gain associated with one or more transmit antennas. Other forms of transmission parameters may include, but are not limited to: coding rate (e.g., ½, ⅓, ⅔, ¾, etc.), modulation scheme (Binary Phase Shift Keying (BPSK), Quadrature Phase Shift Keying (QPSK), 16 Quadrature Amplitude Modulation (16QAM), 64 Quadrature Amplitude Modulation (64QAM), etc.), Orthogonal Frequency Division Multiplexing (OFDM), Direct Sequence Spread Spectrum (DSSS), Frequency Hopping Spread Spectrum (FHSS). For example, in one exemplary embodiment, the first and second interfaces are a Wi-Fi transceiver, and Bluetooth transceiver, respectively. The Wi-Fi transceiver initializes a WLAN, and begins transmission of a test pattern according to Modulation and Coding Scheme 0 (MCS0) at 2.4 GHz; MCS0 specifies a Binary Phase Shift Key (BPSK) modulation with a ½ code rate (one (1) information bit encoded in two (2) code bits). MCS0 is the worst case WLAN operational scenario (i.e., produces the most interference), and will therefore create the worst case interference. It is appreciated that in other technologies (or future versions yet to be developed), other test patterns or schemes may be utilized consistent with the particular attributes of those technologies.

At step 204, the interference received on at least another wireless interface is measured. Common metrics of radio interference include, but are not limited to, Signal to Noise Ratio (SNR), Received Signal Strength Indication (RSSI), Bit Error Rate (BER), Block Error Rate (BLER), etc.

For example, in the aforementioned embodiment, once the Wi-Fi transceiver is transmitting the test pattern, the Bluetooth transceiver starts a Received Signal Strength Indication (RSSI) sweep, and measures the resulting antenna isolation as a function of received interfering power as a function of Bluetooth channels.

In another example, the Bluetooth transceiver may periodically perform a Received Signal Strength Indication (RSSI) sweep during runtime, to measure the antenna isolation with actual data.

Each of the transmit chains may also be selectively enabled and disabled to determine the influence contributed by each corresponding transmit chain. For example, in a three (3) antenna system, the first antenna transmits and its generated interference is measured, then the second antenna, and then the third antenna. Various combinations may also be evaluated (e.g., first and third chains only, second and third chains only, etc.).

Alternatively, each of the transmit chains transmits simultaneously, where the chain specific interference can be determined from the signal itself. For example, each chain may output a unique signature, etc.

At step 206 of the method, the received interference is evaluated for acceptability. If the received interference is unacceptable, then the process is repeated with one or more parameters having been adjusted (e.g., according to a predefined adjustment scheme or plan, as described below). If the received interference is acceptable, then the appropriate parameters are stored, and cataloged for later use.

In one embodiment, the parameters for each transmit chain of the first air interface are adjusted based on the amount of influence exerted exhibited by the transmit chain on the overall interference experienced at the second interface. For example, once the amount of interference associated with each transmit chain has been determined, the transmit gain parameter for the chain contributing the largest amount of interference is reduced, thereby leveraging the previously described relationship that reductions in transmission gain result in disproportionate reductions in interference.

In another example, once the amount of interference for each transmit chain has been determined, the transmit gain parameter for each chain is adjusted such that each contributes a predetermined acceptable level of interference. For instance, the adjustment may be made in proportion to the amount of their contributed interference, or according to other operational considerations (e.g., equalizing contributed interference across all antennas, legal requirements, geography, etc.), etc. For example, certain countries may have different emission requirements; the transmit gain parameters may be adjusted differently based on a country code or different regulatory standards (e.g., Federal Communications Commission (FCC), European Telecommunications Standards Institute (ETSI), Asia Pacific Countries (APAC), Korea, or RoW (Rest of the World), etc.) In yet another embodiment, the parameters for each transmit chain of the first interface are adjusted based on one or more guaranteed or required levels of service for the first or second interface (e.g., so as to maintain QoS levels for a particular transport).

Moreover, devices which are calibrated at the factory prior to delivery to a customer may be calibrated according to one or more profiles. For example, a device may be configured with a first profile for maximizing user experience (e.g., by maximizing PAN receptivity), and a second profile for maximizing data transfer rate (e.g., by maximizing WLAN performance). Yet additional profiles may be used as well, such as e.g., a third profile for a particular use context (e.g., "work" or "home") or location. In other variants, an entire gradiated range of performance (e.g., tradeoff between the two or more profiles) can be preconfigured. These profiles may be selected by the user, such as via an on-screen tool or application. Alternatively, "intelligent" switching or selection of level of tradeoff between the profiles may be used, such as where the user device includes an application or algorithm which dynamically adjusts the tradeoff as a function of one or more sensed or measured parameters (e.g., historical data rate, use of user peripherals such as Bluetooth mouse or keyboard, etc.).

Moreover, it is recognized that during actual runtime use (e.g., as opposed to a test mode), the device may have specific data requirements not satisfied by predefined profiles. Accordingly, in certain embodiments of the present invention, the parameters for each transmit chain of the first interface are adjusted based on one or more data requirements of the first or second interface. For example, a device may configure itself to balance tradeoffs between performance of a PAN, with performance of a WLAN. In some variants, such tradeoffs can be based on data rate, data latency, data throughput, priority, etc.

Once interference calibration profiles have been determined, the process completes execution, and exits (step 208). In some variants, step 208 additionally includes cataloging and storing the parameters or sets of parameters for later use.

It is of particular note that due to the unpredictable nature of RF interference, calibrated vectors may vary to some degree even within with the same device type. Accordingly, in some manufacturing environments, same type devices may all use the same power matrix determined by a worst case unit. For example, a worst case device prototype can be used to determine a power matrix that is hardcoded into all production models. Alternatively, each manufactured unit can be tested and programmed individually (e.g., a power matrix is determined and hardcoded into each unit during manufacturing). Determining the optimal power matrix for each manufactured unit takes more time, but results in better performance.

Those of ordinary skill in the related art will also recognize that various aspects of the present invention have substantial business or commercial utility.

For example, tools and services for calibrating devices (such as laptops, PDAs, smartphones, personal media devices) can be sold or provided to a customer, such as on a one time or recurring service fee basis, or may be provided as a promotion or incentive. This may be accomplished for example via the Internet (e.g., using an on-line configuration interface or "wizard" which allows the customer to configure their prospective device according to any number of different options). The configured device is optimized according to, for example, the methodology of FIG. 2 based on its measured antenna isolation, and/or optionally any other parameters of interest as previously described herein.

In another example, consumers may bring back their already purchased client devices (e.g., laptops, smartphones, etc.) for or after prior reconfiguration, so as to have them "re-optimized" for the new configuration.

Alternatively, the user's device may be configured with its own indigenous evaluation/optimization capability as previously described. For example, a laptop user might install a Wi-Fi card (or an upgraded version thereof) themselves if their production device was not so equipped. With the new card, there may be significant interference with another existing or co-installed air interface such as Bluetooth, hence requiring optimization according to the methods described herein. The computer manufacturer, the user themselves, or a third party distributor/repair facility, could then measure the antenna isolation, and adjust the computer (e.g., program the indigenous algorithm already resident on the computer previously described, or add the algorithm if not there and configure appropriately) to optimize operation of the interfaces (and the device as a whole) so as to optimize the desired attributes, such as mitigation of interference.

Alternatively, it will be recognized that the client device and algorithm may be configured to perform this step automatically; e.g., by sensing the presence or addition of new hardware (e.g., Wi-Fi card), and then conducting an antenna isolation or other parametric evaluation (or prompting the user to do so, such as via a third party) as described in, for example, co-owned and co-pending U.S. patent application Ser. No. 12/215,574 filed Jun. 26, 2008 and entitled "Methods And Apparatus For Antenna Isolation-Dependent Coexistence In Wireless Systems", the contents of which are incorporated herein by reference in its entirety. Once the isolation data is obtained, whether manually or automatically, the optimization algorithm can use this data to select the best operational policy or policies for that particular configuration.

Moreover, various embodiments can be used to provide accelerated prototyping capabilities, such as where a prototype device representative of the production run in that particular configuration is tested and optimized based on the actual measured antenna isolation values. Such capabilities can also be used on a per-unit or statistical sampling basis, such as where every production unit (or a statistically significant sampling thereof) is evaluated and optimized. For instance, some devices may use a metallic casing or housing and closely proximate antenna for the various air interfaces, whereas other devices may have a plastic casing with more physically disparate antenna locations.

In yet other incarnations, the particular type of environment in which the device will be predominantly used can be supplied by the requesting consumer, thereby allowing at least some degree of device-specific or customized evaluation and optimization. For instance, if the predominant use of the device will be in an open-air environment where interference is not as significant, then the optimization applied may conceivably be different than that applied where the same unit must be used in a high noise environment. Hence, the present invention contemplates in general the "tuning" of a particular device configuration for use in a particular environment. Targeted tuning can be used create a pricing premium, such as for military specification conformance, etc.

Apparatus—

Figure 3:
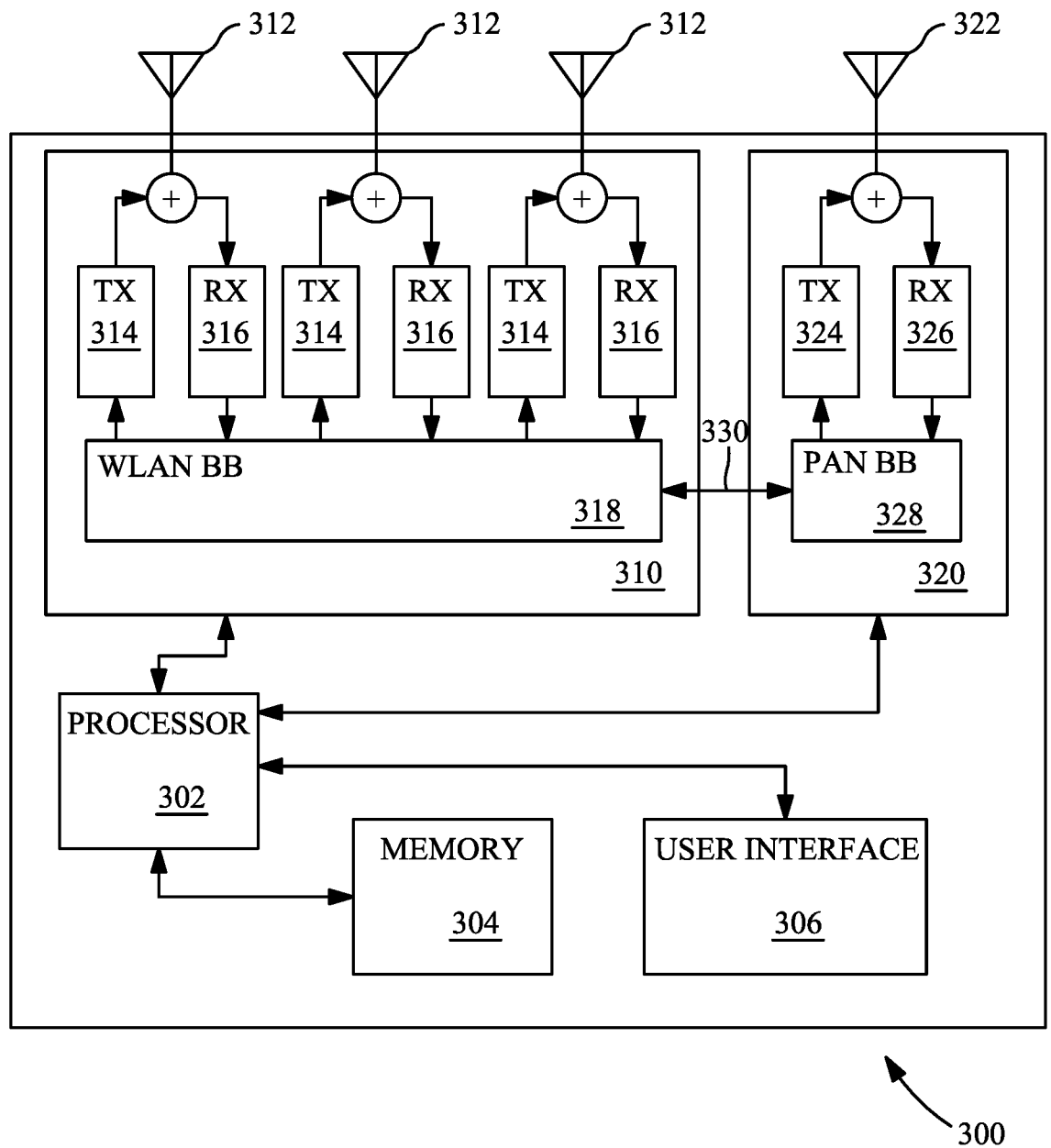
FIG. 3 is a graphical representation of an exemplary apparatus useful for implementing the methods of the present invention.

Referring now to FIG. 3, an exemplary apparatus 300 implementing coexistence features previously described herein is shown and described in detail. The exemplary apparatus of FIG. 3 is a wireless device with a processor subsystem 302 such as a digital signal processor, microprocessor, field-programmable gate array, or plurality of processing components mounted on one or more substrates. The processing subsystem may also comprise an internal cache memory. The processing subsystem is connected to a memory subsystem 304 comprising memory which may for example, comprise SRAM, flash and SDRAM components. The memory subsystem may implement one or a more of DMA type hardware, so as to facilitate data accesses as is well known in the art. The memory subsystem contains computer-executable instructions which are executable by the processor subsystem.

The user interface subsystem 306 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

The apparatus 300 of FIG. 3 additionally comprises a WLAN module 310 and associated WLAN antennas 312 and a PAN module 320 and associated PAN antennas 322 are substantially co-located with one another, thereby introducing some level of RF interference as a result of less-than-optimal antenna isolation. However, it will be recognized that the different modules may also reside in different physical devices which themselves are proximate to one another, as previously described.

It will be appreciated that while described in the exemplary context of Personal Area Network (PAN) interfaces and Wireless Local Area Network (WLAN) interfaces, the apparatus 300 of FIG. 3 is in no way so limited. In fact, various aspects of the present invention are broadly applicable to any wireless interface, including without limitation, cellular networks, satellite and terrestrial networks, ad hoc peer-to-peer networks, Metropolitan Area Networks (MAN), etc.

Referring now to the WLAN module 310 and WLAN antenna 312; as previously alluded to a WLAN module generally comprises a number of transmit 314 and receive chains 316. Each transmit and receive chain may share an antenna 312 (as shown), or may each have their own antenna. The multi-antenna array is managed by the WLAN baseband 318.

Similarly, the PAN module 320 and PAN antenna 322; generally comprises a number of transmit 324 and receive chains 326. Each transmit and receive chain may share an antenna 322 (as shown), or may each have their own antenna. The multi-antenna array is managed by the PAN baseband 328.

While there are three (3) WLAN antennas and one (1) PAN antenna shown, it is readily appreciated by those of ordinary skill that both higher and lower order antenna arrays (e.g., one (1), two (2), four (4), five (5), etc.) may be used consistent with the invention.

In one such embodiment, each transmit chain generally comprises a modulator, digital to analog (D/A) converter, mixers, and amplifier. Each receive chain generally comprises automatic gain control (AGC), automatic frequency control (AFC), mixers, an A/D converter, and demodulator.

Each transmit chain may be configured to additionally receive a parameter which is used to modify the behavior of the transmit chain. The modified behavior of the each transmit chain is structured to reduce its impact on overall interference received at the PAN interface. In one embodiment, the parameter is an adjustment to amplifier gain. In alternate embodiments, the parameter may adjust operation of the D/A conversion, and or mixer operation.

In one exemplary embodiment, the parameters are derived from a profile which is locally stored at the device. In some variants, the profiles are stored or hardcoded within the WLAN baseband 318. In yet other variants, the profiles may be stored within device memory 304 and/or hardcoded to the processor subsystem 302.

In alternate embodiments, the parameters may be calculated at runtime, based on one or more interference parameters received from the PAN interface. The WLAN and PAN interface may also share a common communication interface 330 such as: an I2C, serial bus, etc., thereby enabling both interfaces to coordinate behavior. In various implementations, the common communication interface enables the PAN to request or dictate appropriate WLAN parameters. For example, in one embodiment, a Wi-Fi/Bluetooth device executes a calibration process to minimize the effect of the Wi-Fi on the Bluetooth interface. The common communication bus may additionally offer time sharing coexistence capabilities to support legacy coexistence solutions.

In one exemplary embodiment, the apparatus 300 of FIG. 3 is additionally configured to incorporate interference management schemes as described in co-owned and co-pending U.S. patent application Ser. No. 12/006,992 filed Jan. 7, 2008 and entitled "Methods and Apparatus for Wireless Device Coexistence", previously incorporated by reference in its entirety. Specifically, in when interference between the co-located wireless technologies is relatively high, a "closed-loop" approach is employed which includes the access point or gateway in the optimization process. This approach enhances data throughput on the differing wireless implementations by, inter alia, implementing priority-based time sharing between the respective wireless devices. This closed-loop solution can then be enabled or disabled based on the status of the operating criteria. Priorities can be assigned for example based on the type of packet or data to be sent, application priorities, user priorities and/or wireless device usage. Further, because the system is a closed-loop configuration, other parameters can be adjusted as well (such as e.g., transmitter power level, etc.) within the context of one another in order to further mitigate the effects of interference and enhance user experience with the client device.

In another embodiment, the apparatus 300 of FIG. 3 is additionally configured to incorporate interference management schemes as described in co-owned and co-pending Ser. No. 12/082,586 filed Apr. 11, 2008 entitled "Methods And Apparatus For Network Capacity Enhancement For Wireless Device Coexistence", previously incorporated by reference in its entirety. For example, in one exemplary WLAN/BT implementation, the portable or client device proactively monitors its own network traffic, as well as optionally seeking out information regarding the number of clients connected within the same network (i.e., number of users connected to an AP) as well as monitor its own received signal strength indication (RSSI). The device determines how much of its network traffic goes between the two competing wireless protocols, and adjusts its WLAN/BT coexistence scheme accordingly. This exemplary implementation also provides a seamless user experience, allowing for an effectively invisible and automatic dynamic optimization by the device (or alternatively one with any degree of user/developer involvement that is desired, such as via a software-based user interface).

In still another embodiment, the apparatus 300 of FIG. 3 is additionally configured to incorporate antenna management schemes as described in co-owned and co-pending Ser. No. 12/215,574 filed Jun. 26, 2008 entitled "Methods and Apparatus for Antenna Isolation-Dependent Coexistence in Wireless Systems", previously incorporated by reference in its entirety. Specifically, as described in greater detail therein, a software algorithm can evaluate the operational status of various components (e.g., whether the PAN interface is active), and whether overlapping spectrum is used, and based on the isolation characteristics of the various PAN and WLAN antennae, select either a MIMO or SISO mode of operation for the WLAN interface.

Still further, the apparatus 300 of FIG. 3 may additionally be configured to incorporate antenna management schemes as described in co-owned and co-pending Ser. No. 12/573,755 filed Oct. 5, 2009 entitled "Methods and Apparatus for Enhanced Coexistence Algorithms In Wireless Systems", previously incorporated by reference in its entirety. Various embodiments can utilize information (including for example the Receiver Signal Strength Index (RSSI) at the receiver for one of the multiple air interfaces of the device) to determine whether or not a modified spread-spectrum mapping should be executed. The modified AFH algorithm effectively lowers the isolation requirement needed between the interfaces on the computing device by implementing one or more "intelligent" management functions (e.g., avoiding certain frequency bands in proximity to the transmitter).

Still other embodiments of the apparatus 300 may incorporate various aspects as described in and Ser. No. 12/821,823 filed Jun. 23, 2010 entitled "Methods and Apparatus for Dynamic Wireless Device Coexistence", previously incorporated by reference in its entirety. Specifically, as described therein, multiple interference management profiles can be used to multiple air interfaces disposed within a physically constrained device under various physical configurations. For example, such different configuration scenarios might relate to the top and bottom portions of a "clamshell" type housing being at certain positions relative to one another, the cover of a slide-type enclosure being open or closed, an first component which is articulated in multiple dimensions with respect to another, and the like.

Example Operation—

Figure 4:
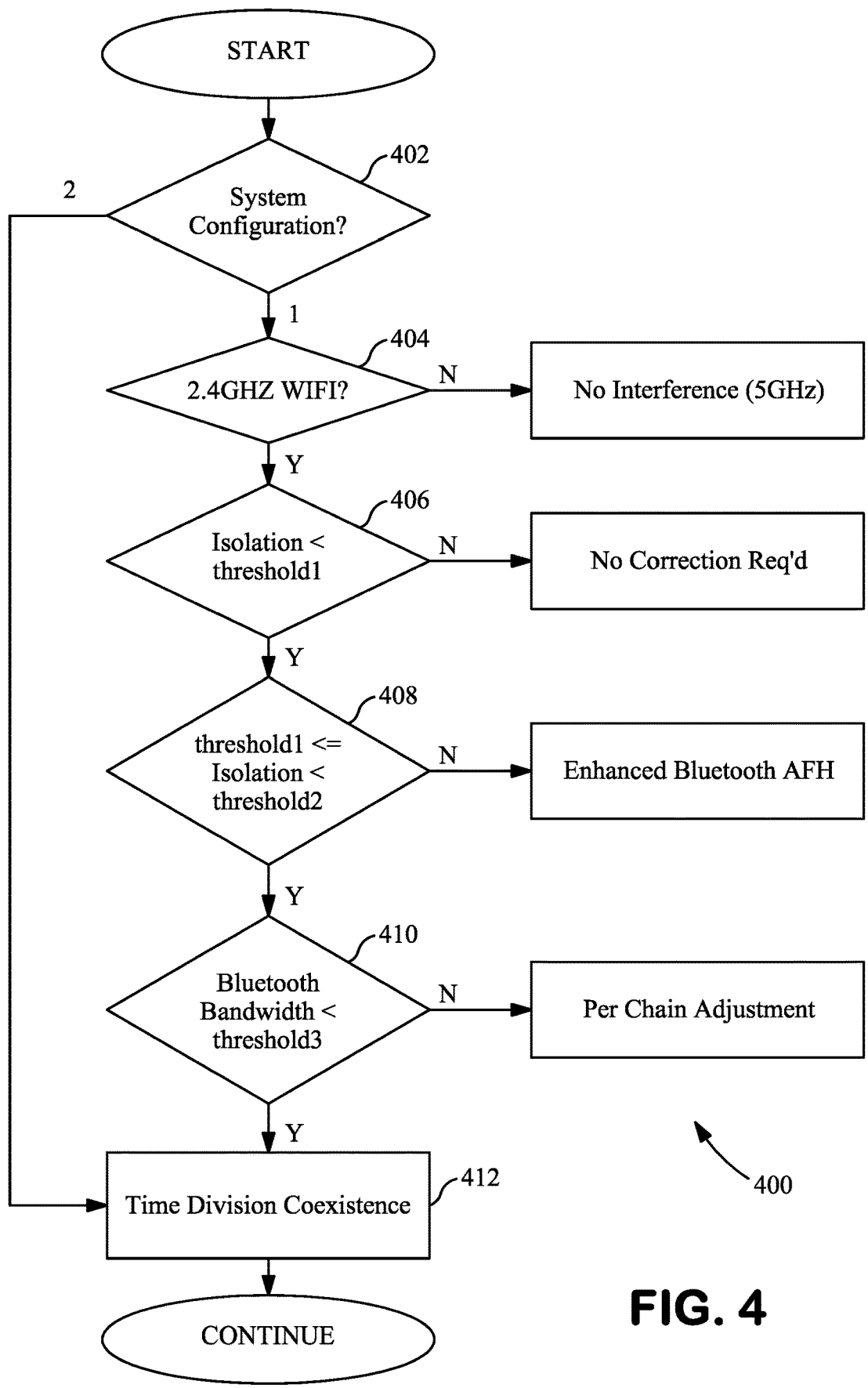
FIG. 4 is a logical flow diagram illustrating one exemplary method for compensating for the effects of signal interference between a Wi-Fi and Bluetooth interface, in accordance with the present invention.

Referring now to FIG. 4, one example of the operation of the invention is provided. This example should in no way be considered limiting on the broader principles of the invention.

The method 400 of FIG. 4 implements a multi-leveled interference mitigation scheme between a 3×3 Wi-Fi interface, and a Bluetooth (BT) interface at the shared frequency range of 2.4 GHz. The multi-leveled interference mitigation scheme uses various features of the present invention, and additionally incorporates various legacy interference mitigation schemes to maximize overall device operation.

At step 402 of the method 400, the device 300 determines if it operating in one or more known configurations. For example, in one variant, the device determines if it is operating in an open (1) or clamshell (2) operation. During clamshell operation, the Wi-Fi and BT interfaces may have very poor antenna separation, thus the device automatically changes to time division coexistence (step 412). Similarly, coexistence problems only occur in the shared 2.4 GHz frequency band, thus if Wi-Fi operation is performed at 5 GHz, there is no coexistence problem (step 404). Other types of operational configurations that may automatically skip certain stages of the mitigation scheme include changes to physical form factor, changes to transmission scheme, changes to bandwidth, etc.

Referring now to step 406, as long as isolation between the Wi-Fi and BT interfaces remains above an acceptable threshold, no correction is required, as the antenna isolation (and hence level of interference) is sufficient to support simultaneous Wi-Fi and BT operation (step 406).

However, once isolation between the Wi-Fi and BT interface degrades below a first threshold but remains above a second threshold (based on e.g., Wi-Fi/BT antenna measurement results), the BT interface will deploy enhanced adaptive frequency hopping (AFH) schemes (according to existing interference avoidance schemes); the BT interface may skip more than 22 MHz of WLAN channel (step 408).

If isolation continues to degrade below the second threshold, then the Bluetooth bandwidth is checked against a third threshold (410). If the Bluetooth bandwidth utilization is relatively low, then the Wi-Fi can operate in time division coexistence mode (step 412) since BT and Wi-Fi performance are still acceptable. However, if the Bluetooth bandwidth utilization exceeds the third threshold then Wi-Fi transmit power is reduced on one or more chains (transmit antenna 0, 1, 2) according to predetermined gain parameters (−a, −b, −c). Similarly, if the BT transmission power is high, and Wi-Fi operation is compromised, BT transmit power will be reduced, and the devices remain in concurrent operation without the need for prior art "time sharing".

Figure 5:
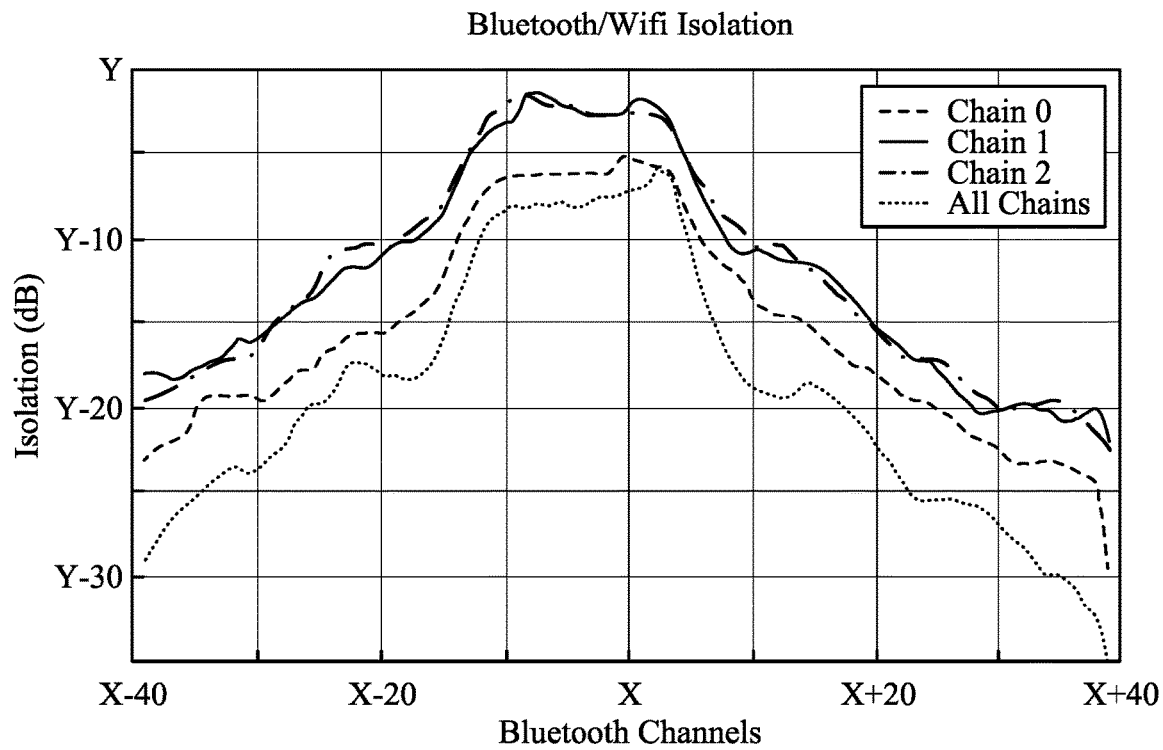
FIG. 5 is a graphical representation of a measurement of antenna isolation as a function of Bluetooth channels, useful in illustrating various aspects of the present invention.
Figure 6:
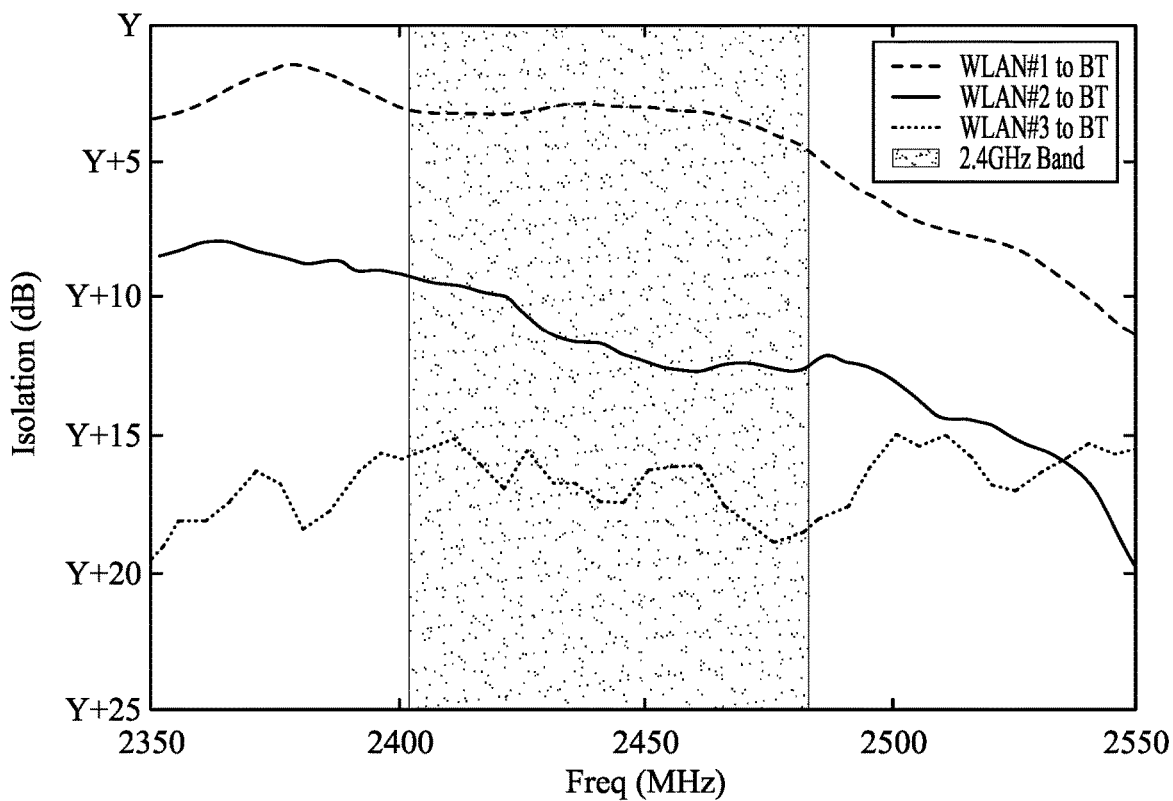
FIG. 6 is a graphical representation of a measurement of antenna isolation as a function of frequency, useful in illustrating various aspects of the present invention.

As a brief aside, the values for predetermined gain parameters (or so-called power matrix (−a, −b, −c)) can be determined ahead of time if desired using the aforementioned calibration sequence described in Interference Calibration. For example, in one exemplary embodiment, the Wi-Fi/BT device is tested ahead of time with a test pattern operating at MCS0. The device transmits at 2.4 GHz, and the resulting interference is measured at the BT interface. The BT interface performs a RSSI sweep, and measures the relative isolation over each BT channel for each of the Wi-Fi transmit chains. FIG. 5 represents one sample measurement of antenna isolation for each transmit chain, as a function of BT channels. FIG. 6 represents another sample measurement performed by a network analyzer of antenna isolation versus frequency. As shown in both FIGS. 5 and 6, the majority of interference is caused by Chain 0. Accordingly, by lowering the transmit power of Chain 0, the overall interference measured at the BT receiver is greatly (disproportionately) reduced.

Figure 7A:
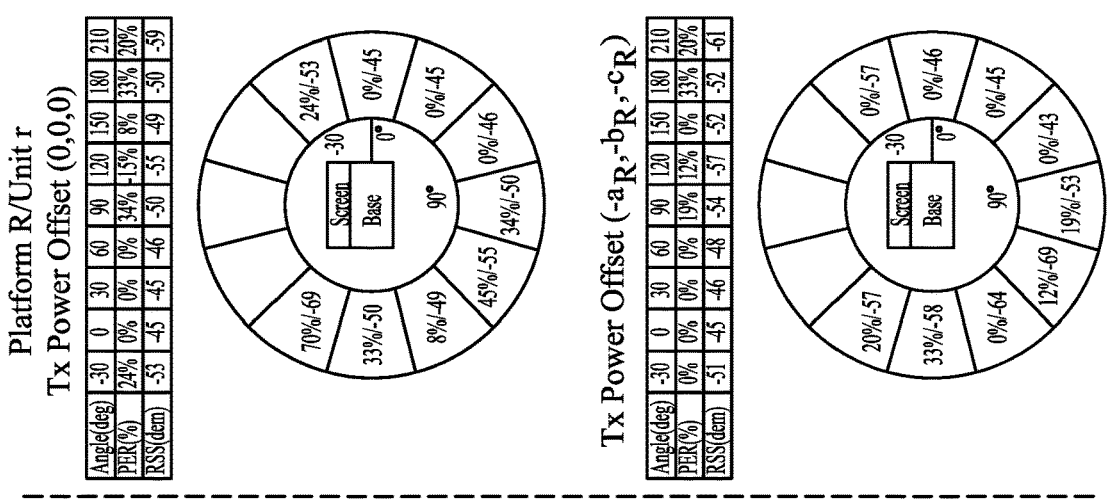
FIG. 7A is a graphical representation of device performance as a function of orientation (in degrees), useful in illustrating various aspects of the present invention.
Figure 7A:
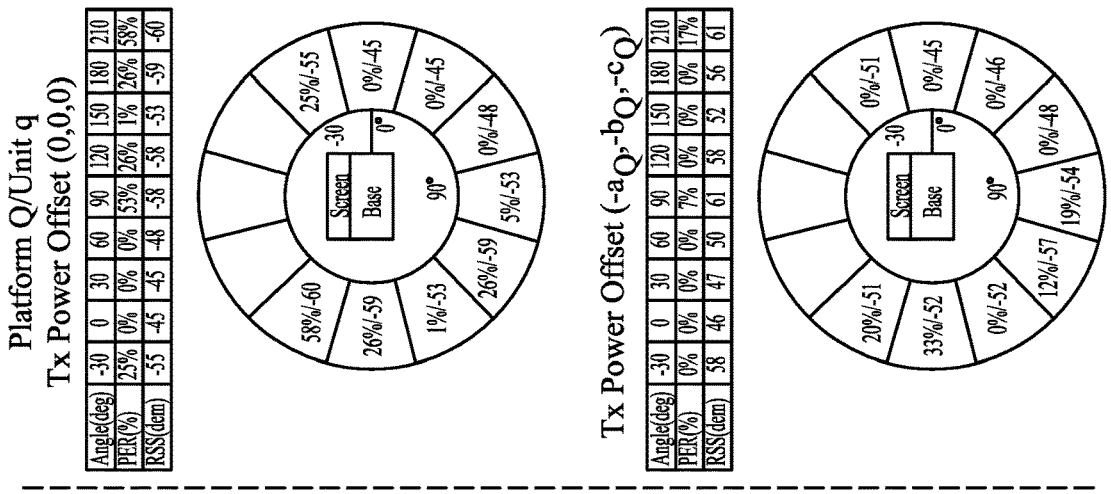
Figure 7A:
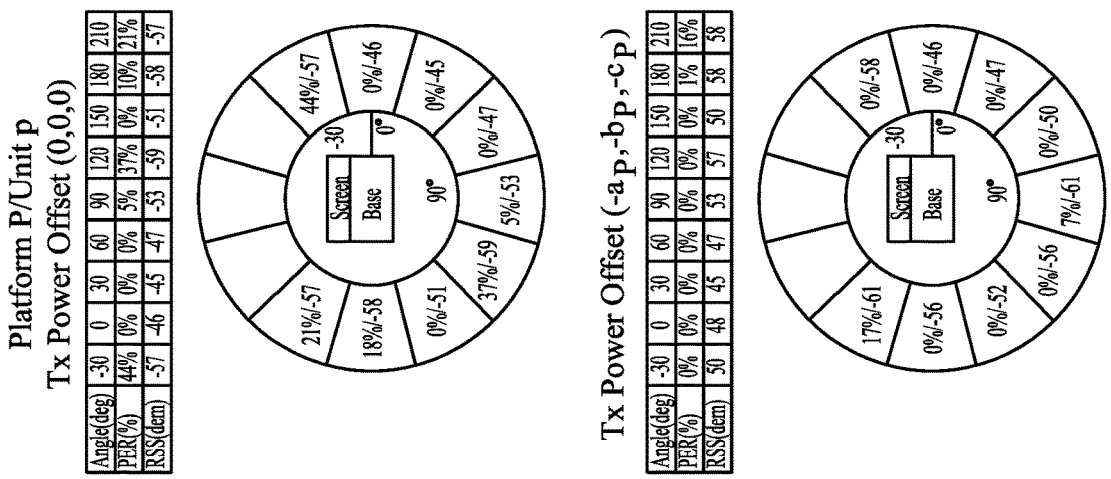

FIG. 7A illustrates the resulting increases in performance between platforms with and without use of the calibrated power matrix. As shown, a first, second, and third platform are illustrated with a transmit power with no adjustment (0, 0, 0), and with adjusted vectors (−a, −b, −c). Without per-chain power control, the BT packet error rate (PER) is comparatively high; in contrast, the adjusted transmit chains advantageously provide acceptable levels of BT PER. Furthermore, as shown, the power matrix can be (and generally is) different between different platforms.

Figure 7B:
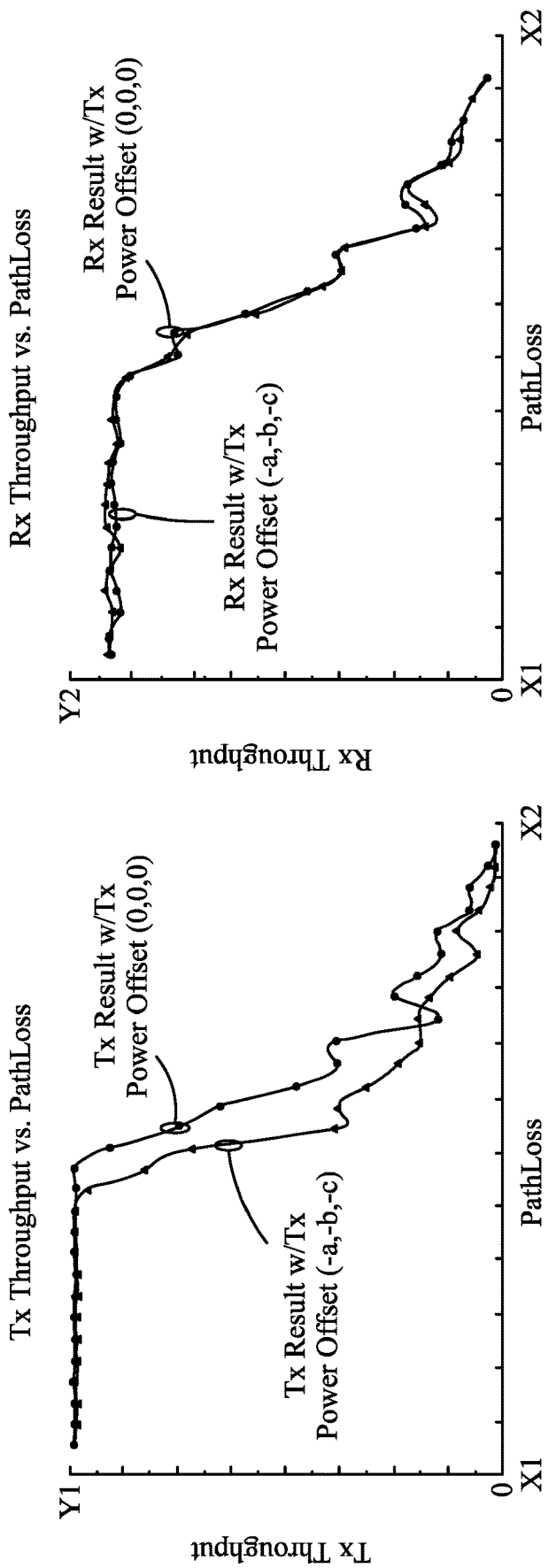
FIG. 7B is a graphical representation of device throughput performance as a function of attenuation, useful in illustrating various aspects of the present invention.

FIG. 7B illustrates the corresponding Wi-Fi performance impact. As illustrated in FIG. 7B, no appreciable loss is experienced in the inband portion of the Wi-Fi spectrum. However, out of band power is greatly reduced. FIG. 7B shows that there is no appreciable impact on the receive chains.

In some embodiments (not shown), extremely poor performance for either Wi-Fi or Bluetooth will revert to the "fall back" position of using time division coexistence (step 412).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX A

Exemplary Bluetooth Bandwidth Calculation—

Each Bluetooth profile is assigned or allocated a specific bandwidth (e.g., (i) SCO (mono audio profile)BW=bw1%, (ii) HID (Human Interface Device, such as mouse and keyboard) BW=bw2%, (iii) ACL (such as file transfer and etc) BW=bw3%, etc.).

The total used bandwidth (usedBandWidth) can be calculated as:

```
// add SCO bandwidth
float usedBandWidth += (((float)SCOLinksActive * constant2) / constant1);
// add HID bandwidth
usedBandWidth += (((twosniffAttemptDevices * constant3) +
(oneSniffAttemptDevices * constant4)) / constant1);
// add ACL connection factor. we should try to know how much data is flowing,
// but that is not trivial, so for now if we have
// an ACL connection of any kind, just add constant5 (%BW). This assumes that
// the link is actively being used at full speed.
usedBandWidth += (((float)ACLConnections) * constant5);
// add in bandwidth for scans
scanBandWidth = (isInquiryScanEnabled != kNoScansEnabled) ? constant6 : 0.0;
scanBandWidth += ( pageable ? constant7 : 0.0 ); //aways assume we are pageable
usedBandWidth += scanBandwidth;
// BT actively scanning, need to protect BT scanning
scanBandWidth += ( inquiry_active ? constant8; 0.0 );
if usedBandWidth < constant9, then
usedBandWidth += scanBandWidth;
// make it a percent
usedBandWidth *= 100.0;
```

What is claimed is:

1. A processing subsystem of a wireless device with a plurality of wireless interfaces comprising a first interface and a second interface, the processing subsystem comprising a non-transitory storage medium comprising a plurality of instructions, the plurality of instructions being configured to, when executed on a processing apparatus, cause the processing subsystem to:
   determine a physical configuration of the wireless device;
   determine an operational mode of the first interface of the plurality of wireless interfaces;
   implement an interference-avoidance scheme based on (i) the determined physical configuration of the wireless device and (ii) the determined operational mode of the first interface;
   wherein the implementation of the interference-avoidance scheme is configured to reduce coexistence interference between the first interface and the second interface.

2. The processing subsystem of claim 1, wherein the wireless device comprises a housing, the housing comprising a first portion and a second portion; and
   wherein the physical configuration of the wireless device comprises an open configuration or a clamshell configuration of the first portion and the second portion.

3. The processing subsystem of claim 1, wherein the first interface comprises a Wi-Fi interface, and the second interface comprises a Bluetooth interface.

4. The processing subsystem of claim 1, wherein the first interface and the second interface operate according to different wireless protocol standards.

5. The processing subsystem of claim 1, wherein the plurality of instructions are further configured to measure an isolation level between the first and second interfaces;

wherein the interference-avoidance scheme is implemented responsive to a determination that the measured isolation level is below a first threshold and above a second threshold.

6. The processing subsystem of claim 5, wherein the plurality of instructions are further configured to adjust a parameter of a signal processing chain responsive at least to a determination that the measured isolation level is below the second threshold and above a third threshold.

7. The processing subsystem of claim 6, wherein the plurality of instructions are further configured to cause the wireless device to operate in another coexistence mode responsive at least to a determination that the measured isolation level is below the third threshold.

8. A wireless device, comprising:
a first interface configured to transmit and receive first data according to a first wireless protocol;
a second interface configured to transmit and receive second data via a plurality of channels according to a second wireless protocol, the second wireless protocol differing from the first wireless protocol;
a processing apparatus; and
a non-transitory storage apparatus comprising a storage medium, the storage medium comprising a plurality of instructions configured to, when executed on the processing apparatus, cause the wireless device to:
implement an interference-avoidance scheme on the second interface based on determination of (i) an operational configuration of the wireless device and (ii) an operational mode of the first interface;
wherein the implementation of the interference-avoidance scheme is configured to reduce coexistence interference between the first and the second wireless protocols.

9. The wireless device of claim 8, wherein the plurality of instructions are further configured to measure a value corresponding to coexistence interference between the first and second interfaces;
wherein the interference-avoidance scheme is implemented on the second interface based on the measured value.

10. The wireless device of claim 9, wherein the value is measured at periodic intervals.

11. The wireless device of claim 9, wherein the value is measured at a predetermined operational stage of the wireless device.

12. The wireless device of claim 8, wherein the plurality of instructions are further configured to adjust a parameter of a signal processing chain of the first interface based at least in part on the measured value.

13. The wireless device of claim 12, wherein the parameter comprises at least one transmit power setting that corresponds to the signal processing chain.

14. The wireless device of claim 8, wherein the first wireless interface comprises a multiple input multiple output (MIMO) wireless local area network (WLAN) interface, and the second wireless interface comprises a personal area network (PAN) interface.

15. A method for reducing coexistence interference between a first wireless interface and a second wireless interface, comprising:
determining a physical configuration of a wireless device, the wireless device being enabled to transact data via the first wireless interface and the second wireless interface;
determining an operational mode of the first wireless interface;
reducing interference between the first and second wireless interfaces, the reducing of the interference comprising deploying an interference-avoidance scheme based on (i) the physical configuration of the wireless device being determined to be in a first one of a plurality of physical configurations, and (ii) the operational mode of the first wireless interface.

16. The method of claim 15, further comprising:
measuring an isolation level between the first and second wireless interfaces; and
deploying the interference-avoidance scheme further based on the measured isolation level being between a first threshold level and a second threshold level.

17. The method of claim 16, further comprising:
adjusting a transmit power setting of a signal processing chain of the first wireless interface responsive at least to the measured isolation level being between the second threshold level and a third threshold level.

18. The method of claim 17, wherein the adjusting of the transmit power setting of the signal processing chain of the first wireless interface comprises adjusting the transmit power setting based on one or more gain parameters predetermined by a calibration process.

19. The method of claim 17, further comprising:
causing the wireless device to operate in another coexistence mode responsive at least to the measured isolation level being below the third threshold level.

20. The method of claim 15, further comprising:
causing the wireless device to operate in another coexistence mode based on the physical configuration of the wireless device being determined to be in a second one of the plurality of physical configurations, the second one being different from the first one of the plurality of physical configurations.

* * * * *

UNITED STATES PATENT AND TRADEMARK OFFICE
CERTIFICATE OF CORRECTION

PATENT NO. : 10,616,795 B2
APPLICATION NO. : 15/960421
DATED : April 7, 2020
INVENTOR(S) : Camille Chen et al.

Page 1 of 1

It is certified that error appears in the above-identified patent and that said Letters Patent is hereby corrected as shown below:

On the Title Page

Currently Reads:
"(73) Assignee: Applie Inc. (US)"

Should Read:
--(73) Assignee: Apple Inc. (US)--

Currently Reads:
"(74) Attorney, Agent, or Firm – Gadzkin & Associates, PC"

Should Read:
--(74) Attorney, Agent, or Firm – Gazdzinski & Associates, PC--

Signed and Sealed this
Thirtieth Day of June, 2020

Andrei Iancu
*Director of the United States Patent and Trademark Office*